Sept. 7, 1937.  J. SCHULMAN  2,092,476
SIDE BUMPER
Filed Dec. 16, 1933
Fig. 1.
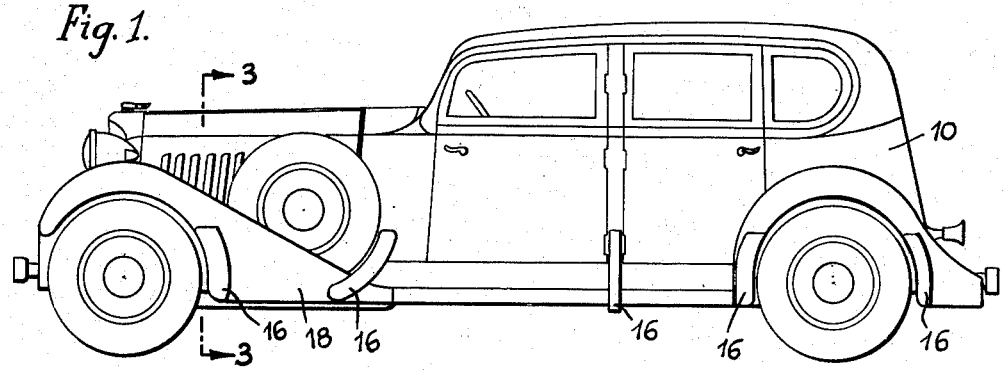
Fig. 2.
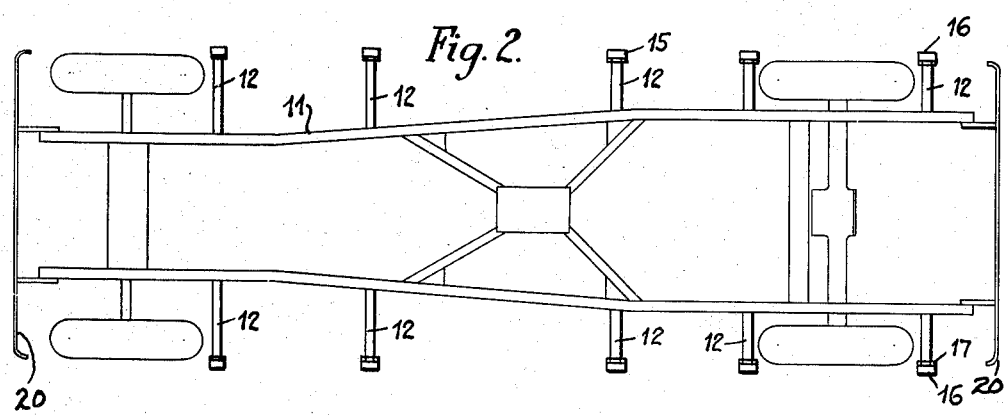
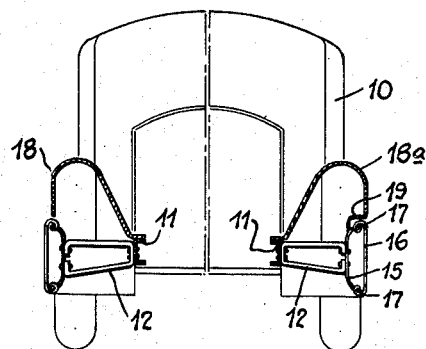
Fig. 3.  Fig. 3a.
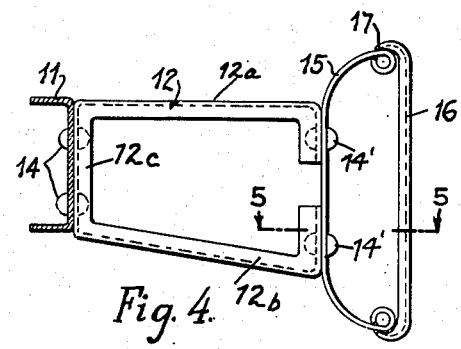
Fig. 4.
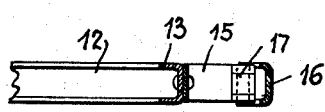
Fig. 5.
INVENTOR.
Joseph Schulman.
BY
ATTORNEY.

Patented Sept. 7, 1937

2,092,476

UNITED STATES PATENT OFFICE 2,092,476

SIDE BUMPER

Joseph Schulman, New York, N. Y.

Application December 16, 1933, Serial No. 702,698

6 Claims. (Cl. 293—55)

This invention relates to bumpers for motor vehicles and more particularly to substantially vertically-arranged side bumper elements therefor. These vertical side bumpers are designed in such a way, as to give fullest efficiency in the protection intended and still maintain the general good appearance of the vehicle.

It is an object of this invention to provide a series of vertical side bumpers conforming to the particular shape and lines of the part with which they are associated.

It is another object of this invention to provide side bumpers including supporting brackets therefor of such construction so as to protect the sides of the vehicle against any compact equivalent to such as are to be taken by the front and rear bumpers.

It is another object of this invention to provide supports for these vertical side bumpers which may be also used to support the fenders and the running board.

It is another object of this invention to arrange the bumpers in such location and numbers as are required to fully protect the vehicle against impacts on its side and still not sacrifice the appearance, efficiency, or design of the vehicle in any way.

It is a further object of this invention to permit lightening of the present fender construction as well as the running boards, as impacts will be taken up fully by these bumpers.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, a drawing depicting certain forms of the invention has been annexed as a part of this disclosure, and in such drawing, like characters of reference denote corresponding parts throughout all the views, of which:—

Fig. 1 represents a side elevation of a motor vehicle showing a typical application of the invention.

Fig. 2 is a plan view of the frame showing the arrangement of the supporting brackets and the bumpers applied.

Fig. 3 is a sectional view along lines 3—3 of Fig. 1, showing the application of a form of bumper embodying the invention.

Fig. 3a is a sectional view similar to Fig. 3 showing the application of another form of bumper embodying the invention.

Fig. 4 is a detail view of a bumper and its bracket or support attached to the channel of the frame.

Fig. 5 is a sectional view along line 5—5 of Fig. 4.

In its essential features, this invention includes a plurality of vertically-diposed bumper elements including suitable brackets therefor, arranged on the sides of the chassis and adapted to protect the sides of the vehicle from injury as a result of impact or collision with another vehicle or other object.

By employing bumpers and brackets or supports in accordance with this invention, an embodiment of which will presently be described, the fenders and running boards of the vehicle can be made of much lighter material for the reason that such bumpers receive the shocks and impacts that otherwise would be received by the fenders and running boards of a vehicle not equipped with devices made in accordance with this invention. The bumpers may function as supports for the fenders and running boards. The bumpers may be made to conform in contour to the parts of the vehicle with which they are associated, the general lines of the vehicle then being undisturbed. Bumper elements may be arranged in such manner that the closures of the vehicle are not interfered with.

The drawing shows a motor vehicle body 10 having the customary frame 11 provided with a series of suitable brackets 12. These brackets 12 are preferably of U section material or channelled as clearly shown at 13 of Fig. 5, and are secured by fastening means 14 to the frame 11. On the outward end of each bracket 12 is provided a strong resilient spring 15, preferably of flat material. The substantially vertical bumpers 16 are securely hinged to the springs 15 at 17. The brackets 12 and springs 15 contribute to resist any blow or impact due to collision.

The bumper element 16 may be arranged to either protrude from the fender 18 as shown in Fig. 3, or may be recessed into a depression 19 in fender 18a as shown in Fig. 3a. It is understood that the fender will have to be formed or cut to clear the bracket 12.

The vertical bumper 16 is preferably made in U section or channelled as shown in Fig. 5 so as to prevent the same from getting caught in sliding along an object as for example entering the garage. This curved or U-shape will also enhance the appearance of the vertical sides of the bumper, especially in the projecting type, such as illustrated in Fig. 3.

In this disclosure the term vertically arranged bumpers or bumper elements is used in contradistinction to the usual horizontal bumpers, such as for example, of the type used at the ends of the motor vehicle and indicated by the numeral 20 in Fig. 2 of the drawing, it being understood that the bumper elements 16 may assume any desired shapes, forms or contours consistent with the parts with which they may be associated. Some of these vertically-arranged bumper elements at the sides of the motor vehicle shown in the drawing assume contours or shapes of parts of the fenders contiguous therewith, while others that of the mounted spare tires or their casings. A bumper element may be arranged between the doors of the vehicle body. Any desired number of bumper elements may be disposed at the sides of the motor vehicle.

It is essential that the brackets or supports to which the bumper elements are secured be strong and sturdy and of such construction as to withstand and resist impacts and blows caused by collisions. Such brackets or supports as are presently used to support or maintain the running boards and fenders of motor vehicles are inadequate as they will bend and buckle when subjected to blows resulting from impact with heavy bodies such as a colliding motor vehicle.

A form of bracket or support found particularly adapted for the purpose intended is represented by the numeral 12 of the drawing. This support is preferably formed of a single piece of material bent or formed to present two arms 12a, 17b, and a rear portion 12c, the latter being adapted for attachment to the frame 11 of the motor vehicle chassis, attachment being brought about by the bolts or rivets 14. The free ends of arms 12a, 12b are bent or formed at an angle as shown at 12d, 12e to provide means to which the bumper element 16 may be attached, the attachment being brought about by the bolts or rivets 14'.

It is understood that any other suitable support or bracket may be employed to carry out the purpose intended, namely, to resist blows and adequately support the bumper element.

It is believed from the above description that those skilled in the art will have no difficulty in understanding the construction, the method of use and operation of the device herein disclosed and a detailed discussion thereof is unnecessary. The invention is of simple and practical construction and is adapted to accomplish among others all of the objects and advantages herein set forth.

Without further analysis, the foregoing will so fully reveal the gist of this invention that others can by applying current knowledge readily adapt it for various applications without omitting certain features, that, from the standpoint of the prior art, fairly constitute essential characteristics of the generic or specific aspects of this invention, and therefore, such adaptations should and are intended to be comprehended within the meaning and range of equivalency of the following claims.

I claim:

1. The combination with a vehicle having a body, fenders and a chassis, individual bumper units at the sides of the vehicle adjacent the body and fenders, each unit comprising a resilient member, a bumper element secured thereto, and a support, said support being shaped to provide two arms and a rear portion, the said member being secured to said arms, the said support being secured at its said rear portion to said chassis.

2. The combination with a vehicle having a body, fenders and a chassis, individual bumper units at the sides of the vehicle adjacent the body and fenders, each unit comprising a bumper element and a support therefor, said support being shaped to provide two arms and a rear portion, the said element being secured to said arms, the said support being secured at its said rear portion to said chassis.

3. The combination with the chassis of a vehicle, a bumper unit for the side of the vehicle comprising a resilient member, a bumper element secured thereto, and a support, said resilient member being secured to said support, said support being secured to said chassis, said element being vertically-arranged at the side of the vehicle when said support is secured to said chassis.

4. The combination with the chassis of a vehicle, a bumper unit for the side of the vehicle comprising a resilient member, a bumper element substantially U-shaped in section secured thereto, and a support substantially U-shaped in section, said support secured to said chassis, said element being vertically-arranged at the side of the vehicle when said support is secured to said chassis.

5. The combination with a vehicle having a body, fenders and a chassis, individual vertical bumper units at the sides of the vehicle adjacent the body and fenders, at least one unit being secured to the chassis intermediate the fenders on a side of the vehicle, each unit comprising a bumper element and a support therefor, said element being secured to the said support, the said support being secured to said chassis.

6. The combination with a vehicle having a body, fenders and a chassis, individual vertical bumper units at the sides of the vehicle adjacent the body and fenders, at least one unit being secured to the chassis intermediate the fenders on a side of the vehicle, each unit comprising a bumper element and a support therefor, said element being secured to the said support, the said support being secured to said chassis, some of said elements being arcuate to conform to the shape of parts of the fenders contiguous thereto whereby to protect the same against injury.

JOSEPH SCHULMAN.